Dec. 17, 1935.   H. M. CREIGHTON ET AL   2,024,207
ACTIVE RAY TREATING DEVICE
Original Filed Jan. 2, 1930   6 Sheets-Sheet 3

Inventors
HARRY M. CREIGHTON
EDWARD C. BERNBT
By their Attorneys
Bohleber & Ledbetter Dec. 17, 1935.   H. M. CREIGHTON ET AL   2,024,207
ACTIVE RAY TREATING DEVICE
Original Filed Jan. 2, 1930   6 Sheets-Sheet 4
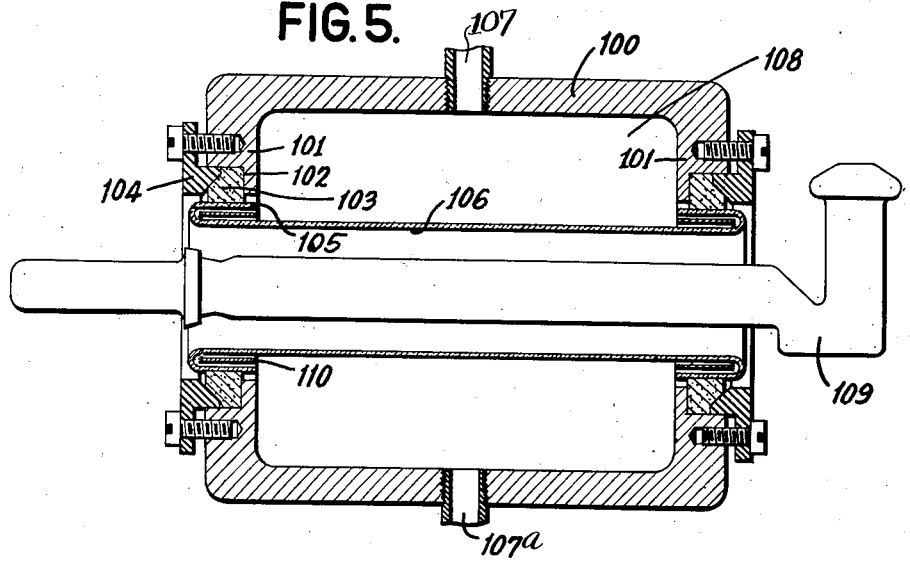
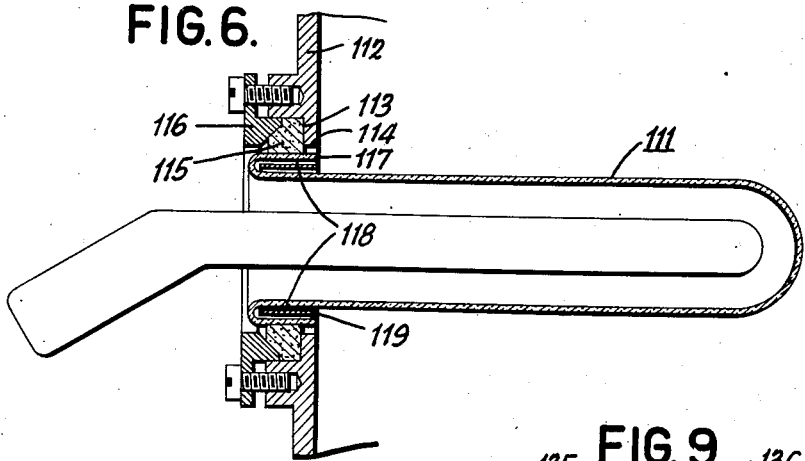
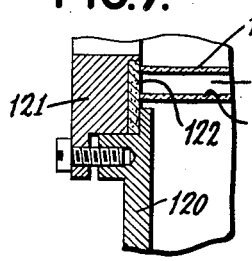
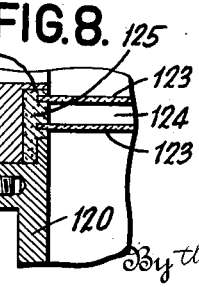
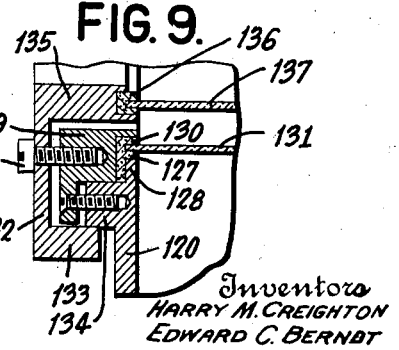
Inventors
HARRY M. CREIGHTON
EDWARD C. BERNDT
By their Attorneys
Bohleber + Ledbetter Dec. 17, 1935.  H. M. CREIGHTON ET AL  2,024,207
ACTIVE RAY TREATING DEVICE
Original Filed Jan. 2, 1930  6 Sheets-Sheet 6

Inventors
HARRY M. CREIGHTON
EDWARD C. BERNDT
By their Attorneys
Bohleber & Ledbetter Patented Dec. 17, 1935

2,024,207

UNITED STATES PATENT OFFICE 2,024,207

ACTIVE RAY TREATING DEVICE

Harry M. Creighton, East Norwalk, and Edward C. Berndt, Norwalk, Conn., assignors to The R. U. V. Engineering Corporation, South Norwalk, Conn., a corporation of Delaware Application January 2, 1930, Serial No. 418,027
Renewed March 14, 1935

25 Claims.  (Cl. 99—2)

The present invention relates to the treatment of substances by active rays in such manner that the substance has imparted thereto or acquires certain desired characteristics, usually those possessed or induced by the ray or rays utilized for the treatment. More particularly, the invention embodies an improved apparatus for the treatment of substances in the above manner, such apparatus affording a means of effectively activating all portions of the substance treated without requiring such manual supervision as to require the exercise of personal judgment in the matter of the character of the travel of the substance with respect to the source of active rays, or the length of time such substance is exposed to the influence of the ray or rays.

It is generally known and commonly understood that active rays, such, for example as ultra-violet rays or other radiations from a source of ultra-violet light have certain marked effects on substances, such effects varying with the time the substances are exposed to the rays. While certain desirable properties may be imparted to the substances upon a predetermined length of exposure to the rays, such effects may be utterly destroyed and the substance itself spoiled by an excess of exposure. Since the distance of the substance from the source of active rays also is a determining factor in the character of the activation thereof, care must be taken to insure a uniform exposure of all portions of the substance to the source and to avoid over exposure of the portion of the substance proximate the source and under exposure of the remote portions thereof.

In the treatment of opaque or partially opaque substances, either in the liquid, solid or gaseous state, this uniform exposure is extremely difficult and has prevented the successful treatment of these substances commercially. For example, it is frequently desirable to treat milk, oils, fruit juice, grains, cereals, water and other substances with active rays, not only to effect the sterilization or partial sterilization thereof, but to impart certain physiological properties thereto. Sufficient exposure, for example, of fruit juice, effects sterilization thereof and kills the organisms therein. Heretofore this has been tried by others by exposing a thin layer or film of the substance to the source of active rays in order that the rays may penetrate the entire body of the substance. In the treatment of thin films of opaque substances however, the side of the film nearest the light source is very apt to be over-treated in an effort to properly treat the portion of the substance on the side of the film remote from the source and particularly so where the substance is treated as hereinafter described with high intensity active rays. It will at once be apparent that the proximate portions of the substance are exposed to a greater degree than the remote portions thereof. Not only is there danger of over exposure of portions of the substance, but a gas such as ozone, generated by the source frequently acts upon the substance and effects undesirable changes therein.

A further factor in the treatment of some substances is the utilization of the greatest possible number of shorter rays from the source without causing undue heating by reason of the longer rays. Since the greatest amount of short rays are available only in close proximity to the source, it would appear to be desirable to expose the substance to the source or as near thereto as possible. Contact with the walls of the lamp however, results in the burning of the substance and causes it to stick thereto, thus obstructing the useful rays and causing grave danger of explosions.

In order to enable the maximum number of beneficial short waves to be used, the undesirable waves are filtered out, or excluded. The radiations of the infra red and visible spectrum have very little effect in producing certain chemical reactions and bactericidal effects, whereas the radiations of the ultra-violet region of the spectrum have a very marked effect. Thus the heat caused by the absorption of the infra red rays frequently spoils the substance, while certain rays in the ultra-violet region cause organisms to grow and others in such region kill them. The proper use of the foregoing rays is accomplished by the selective radiation of rays from a source of active rays, the undesirable rays being filtered out or obstructed while the desirable rays are passed to act upon the substance.

In addition to the foregoing, the invention is concerned with the provision of an improved apparatus in which the tubes of quartz, or other substance are mounted in such manner that the fluid tight packing supporting the same is preserved for long periods of time the packing being shielded to prevent the usual deleterious effects thereon by the treating rays. This is particularly important where highly intensified short waves are used, since the tubes are positioned as near the source as possible to utilize the maximum effect thereof which varies approximately inversely as the square of the distance from the source.

Soft rubber has been found to be the most satisfactory substance to pack the joints between the tubes and treating chambers but rapid deterioration thereof results when it is exposed to the heat and light of the source. To overcome the difficulties experienced in packing the tubes, it is proposed to insulate such packing from the heat and light, the preferred form embodying, in effect, a cooling and insulating jacket for the packing, in certain forms the cooling or insulating being effected by the substance being treated.

In order to effect the selective radiation described above more fully, it is proposed to mount two or more tubes of quartz or other suitable substance concentrically to form separate closed or fluid tight chambers. Supplemental supporting walls are provided to carry the tubes and access to the chambers is afforded by means of suitable connections to permit the introduction and withdrawal of the substances treated or the cooling or insulating or filtering medium.

Accordingly, an object of the invention is to provide a device for treating substances by active rays, such device effectively activating all portions of the substance without depending upon the accuracy of personal supervision to activate the substance uniformly.

A further object of the invention is to provide a device of the above character in which the time of exposure of all portions of a substance is accurately controlled and regulated within the device and without the aid of personal supervision.

A further object of the invention is to provide a device which effectively activates or treats substances of opaque or semi-opaque character, as well as substances bearing solids in suspension.

A further object of the invention is to provide a device of the above character in which the injurious heating is overcome, at the same time causing the substance to pass in close proximity to the source of active rays.

A further object of the invention is to provide a means for filtering out or obstructing the undesirable long rays of the spectrum which produce heating while permitting a maximum of short rays to pass into the treated substance.

A further object of the invention is to provide a device to effect selective radiation from a source of active rays.

A further object of the invention is to provide an improved mounting for tubes of quartz or other suitable material which serve as enclosures for sources of active rays.

A further object of the invention is to provide a mounting of the above character in which the packing is shielded and protected from the deleterious effects of certain of the radiations from the source.

A further object of the invention is to provide an improved packing of the above character in which the substance treated serves as a shield or cooling means for the packing material to preserve the life thereof.

Further objects, not specifically enumerated above, will be apparent as the invention is described in greater detail in connection with the accompanying drawings, wherein:

Figure 5 is a view in section, showing a still further modification of the invention in which the enclosure for the source of active rays is mounted in such manner as to shield the packing therefor.

Figure 6 is a view in section, showing a device similar to Figure 5 but mounting the enclosure at one end only.

Figures 7, 8, and 9, show further modified structures in which a plurality of enclosures are concentrically mounted.

Figure 10:
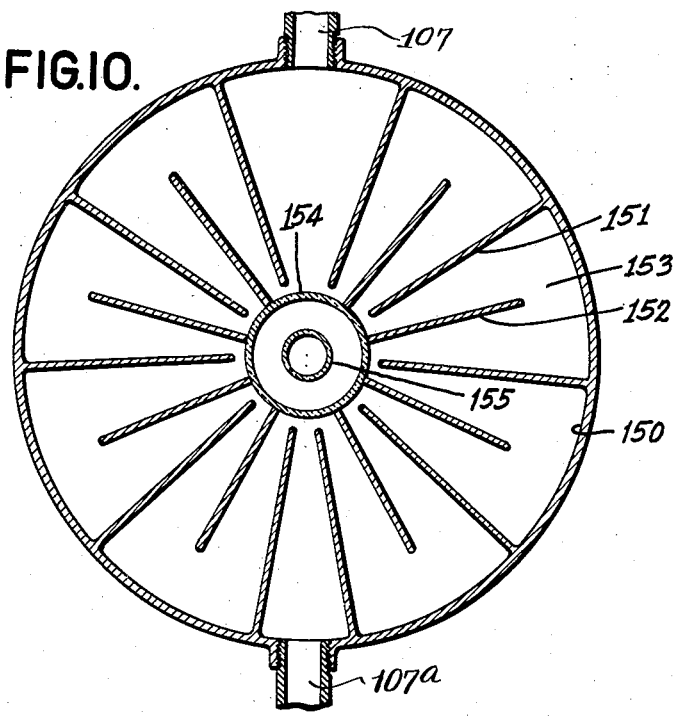

Figure 10 is a view in section, taken transverse to the axis of a device constructed in a modified manner but embodying the principles of the present invention.

Figure 11:
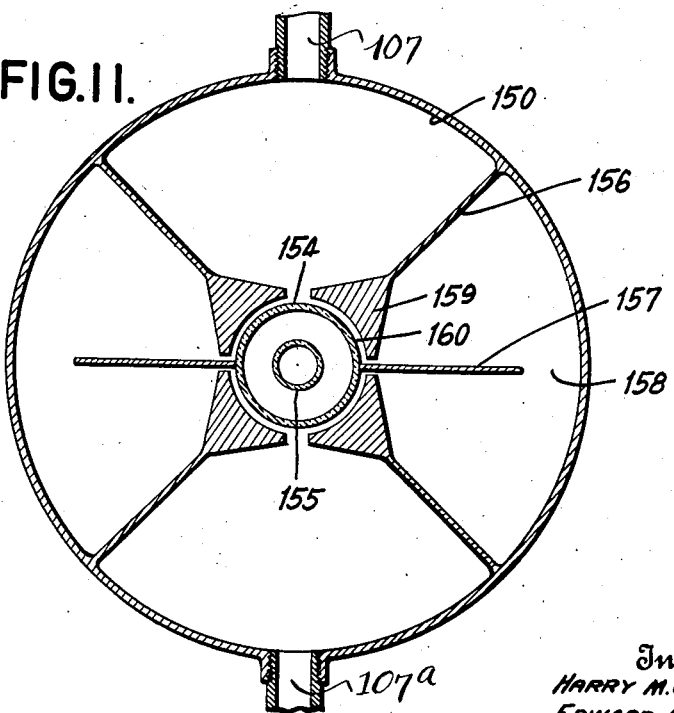

Figure 11 is a view similar to Figure 10, showing a further modified device in which the path of the substance treated lies adjacent the enclosure for the source of active rays over an extended portion thereof.

Figure 12:
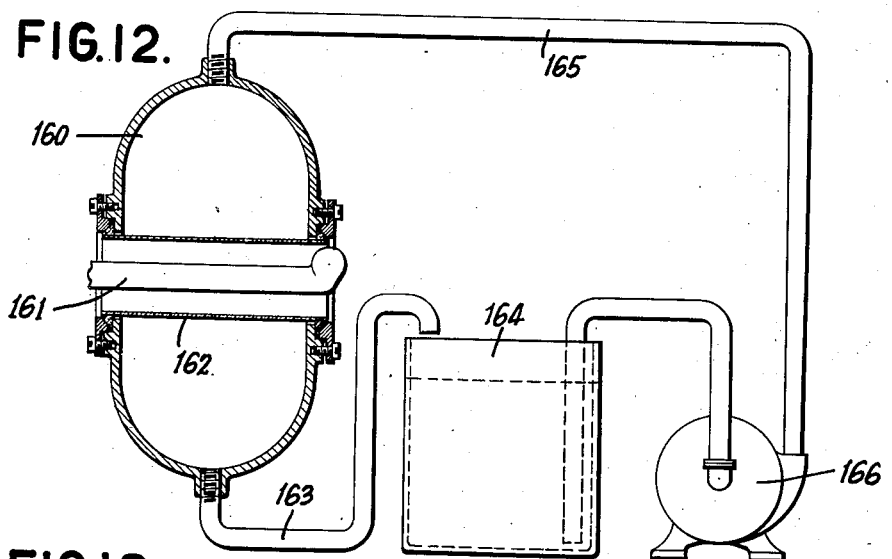

Figure 12 is a view partly in section, showing a system for treating a substance continuously from a source of active rays.

Figure 13:
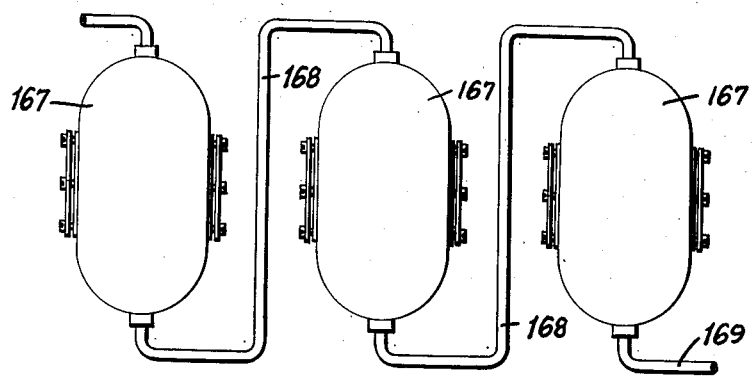

Figure 13 is a view showing a plurality of active ray treating devices connected in tandem to effect the progressive treating of a substance.

Figure 14:
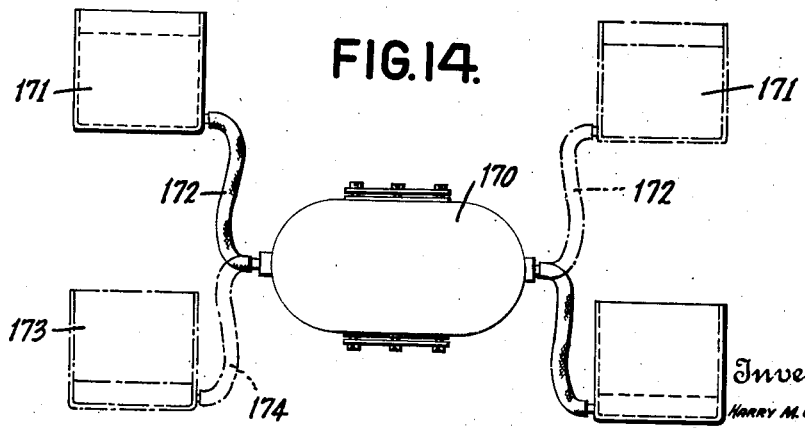

Figure 14 is a view showing a further modified treating device in which a plurality of reservoirs are provided to supply a substance to be treated to the treating chambers under the force of gravity, such substance being carried away in a like manner.

Referring to the above drawings, a cylindrical chamber is shown at 1 having a peripheral cylindrical wall 2 and end walls 3 and 4. Openings 13a and 14a afford a means for introducing a substance into the chamber and effecting the withdrawal of the substance therefrom. A supplemental wall 32 is carried by the wall 4, being secured wtihin an annular recess 4', formed upon the outer surface of the wall 4. Cylindrical bores 7 are formed in the wall 3 and supplemental wall 32, these bores being adapted to receive a cylindrical tube 5 of quartz or other suitable material. Annular recesses 8, formed in the walls 3 and 32, receive annular packings 9, these packings being secured in position by glands 10 in an obvious manner. The cylindrical enclosure 5 is of such size as to afford a degree of clearance between the outer portion thereof and the bores 7, thus providing a type cooperative relationship between the enclosure and walls 3 and 32, which has been found desirable.

A plurality of radial baffles 11 are formed within the housing 1 and extend inwardly to lie adjacent to a rotatable cage 12 carrying baffles 13 which are adapted to align with baffles 11. This cage is rotated by means of gears 14 and shaft 15 to clean the surface of the cylindrical enclosure 5. Since the subject matter of this cleaning mechanism forms the basis of a separate application, Serial Number 336,807, filed February 1, 1929, further description thereof is believed unnecessary herein. It will thus be seen that the flow of fluid, or substance to be treated, is restricted by the baffles and the substance is thus coursed through the chamber 1 in a circuitous route repeatedly coming into close proximity with the enclosure 5.

The foregoing description is directed to a structure which provides an enclosed chamber 1 and a chamber 6 within the cylindrical closure 5. As stated hereinbefore, it is frequently desirable to provide a means for selecting the radiation from the source of active rays in addition to effecting the cooling of the packings carrying the tube 5. Such selective irradiation may be effected by using different solutions of filtering substances in the cooling medium, so as to adapt said medium for simultaneous cooling and filtering. For example solutions of copper sulphate and lead acetate may be used. A second enclosure 16 is therefore provided within which a mercury vapor lamp 17 or other source of active rays is mounted. Tilting mechanism for the lamp is shown at 18 and forms no part of the present invention. Within an annular recess 19 formed on the outer surface of the wall 3, the cylindrical flange 20 of a supporting member 21 is received. Packing 22 is provided to seal the joint between the supporting member and wall 3 and an annular recess 23 is provided in the outer portion of the supporting member to receive packing 24. This packing supports the tube 16 and is secured in position by means of a gland 25. The tube 16 is flared outwardly at 26 and is formed with a reversely extending cylindrical portion 27 which is engaged by the packing 24. The reentrant structure at the end of tube 16 thus affords a chamber between the packing 24 and the source of active rays 17. Within this chamber a suitable fluid may flow to effect the cooling of the joint or to obstruct the flow of the long rays of the spectrum.

The other end of enclosure 16 is mounted in a supporting member 28 which is similar in construction to the supporting member 21. The cylindrical flange 29 is mounted over a corresponding flange 30 on the supplemental wall 32, packing 31 affording the desired joint between supporting member 28 and supplemental wall 32. The supporting member 28 is secured to the supplemental wall by means of bolts 33 in a well known fashion and carries packing 24 and gland 25 in a manner similar to the corresponding elements described in connection with the mounting of the other end of the tube 16.

A supply pipe 34 communicates with the chamber 6 formed between the concentric tubes 5 and 16 to introduce a substance thereinto. Pipes 35, connected at either end of the chamber and upon the side thereof opposite from the pipe 34, carry away the substance and prevent stagnant pockets being formed in such chamber in which portions of the substance may lodge.

Supplemental chambers 36 and 37 may be formed on the cylindrical housing to enclose the source of active rays and the specific structural characteristics of the device, apart from the elements described, may conform to the usual practice in this art.

Figure 1:
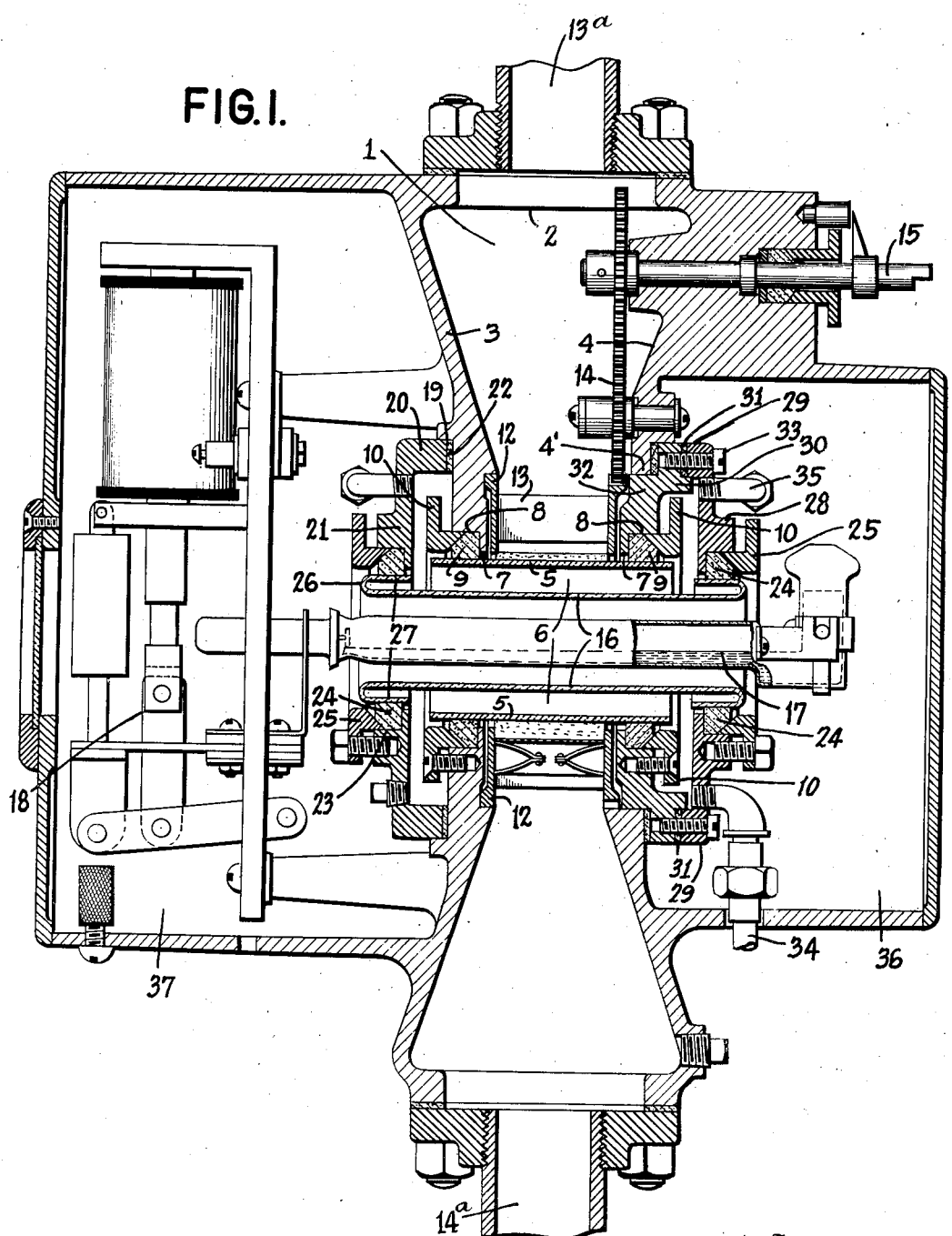
Figure 1 is a view in vertical section, taken through the axis of a device for treating substances with active rays, such device being constructed in accordance with the present invention.
Figure 2:
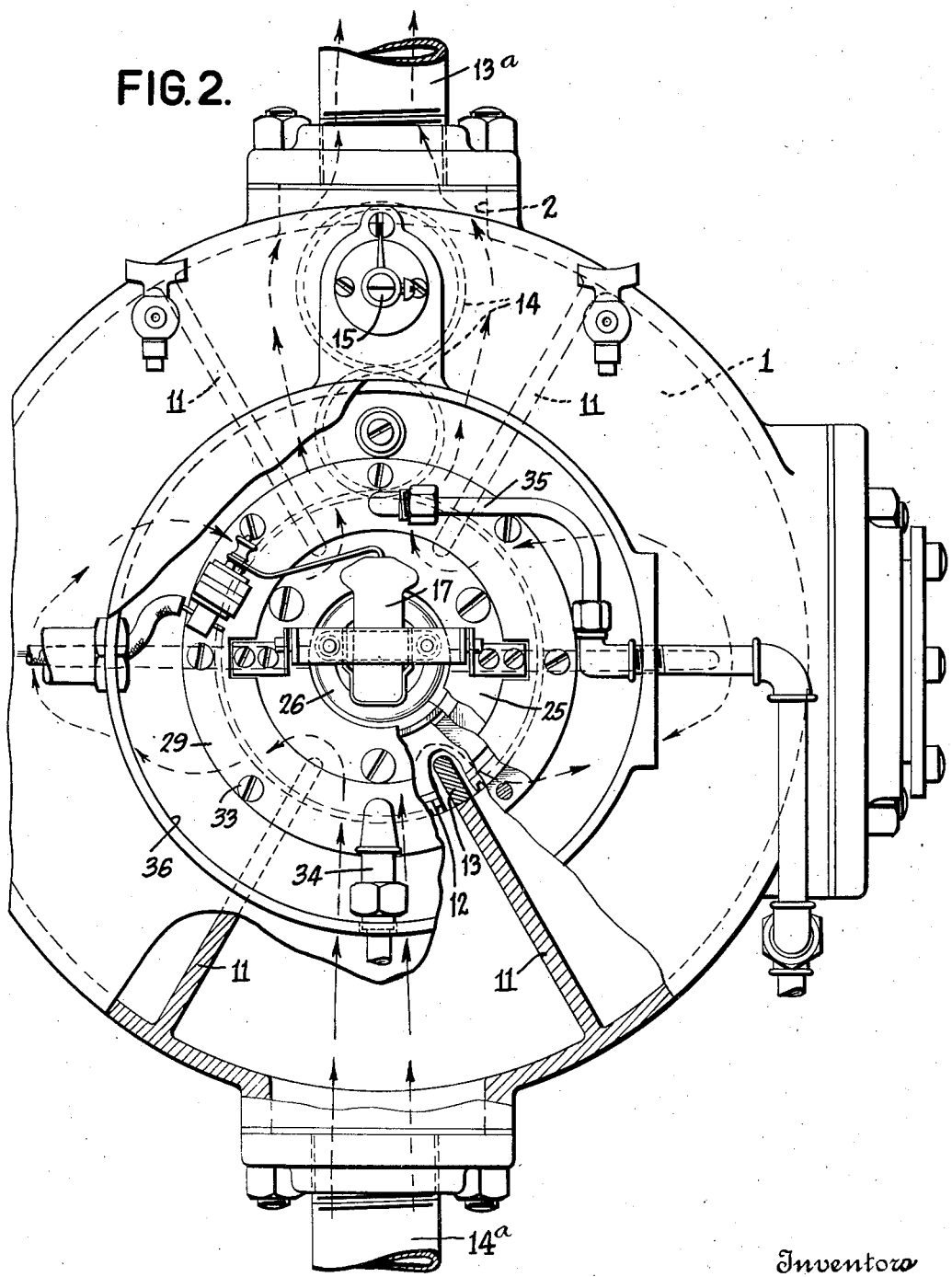
Figure 2 is a view in end elevation, partly broken away and in section, showing the device of Figure 1.

It will be noted more particularly from Figs. 1 and 2 that the distance between the edges of the baffles, which terminate in the portion 13 of Fig. 2, and the quartz tube or enclosure 5 (see Fig. 1) is obviously such that the layer of substance being exposed is of substantial thickness if the substance exposed at this point is opaque or substantially opaque such as milk. It is further more obvious to those skilled in the art that the rays will penetrate such a substance for only a limited distance. In the past somewhat similar devices were used for transparent liquids and were arranged and operated so that the layer of substance being treated was continually agitated or mixed while being exposed thus not only treating proximate or surface portions but all parts of the layer. In the normal operation of the apparatus portions of the substance are successively treated, the treated or proximate portions of the substance then being mixed with the untreated or remote portions thereof.

Figure 3:
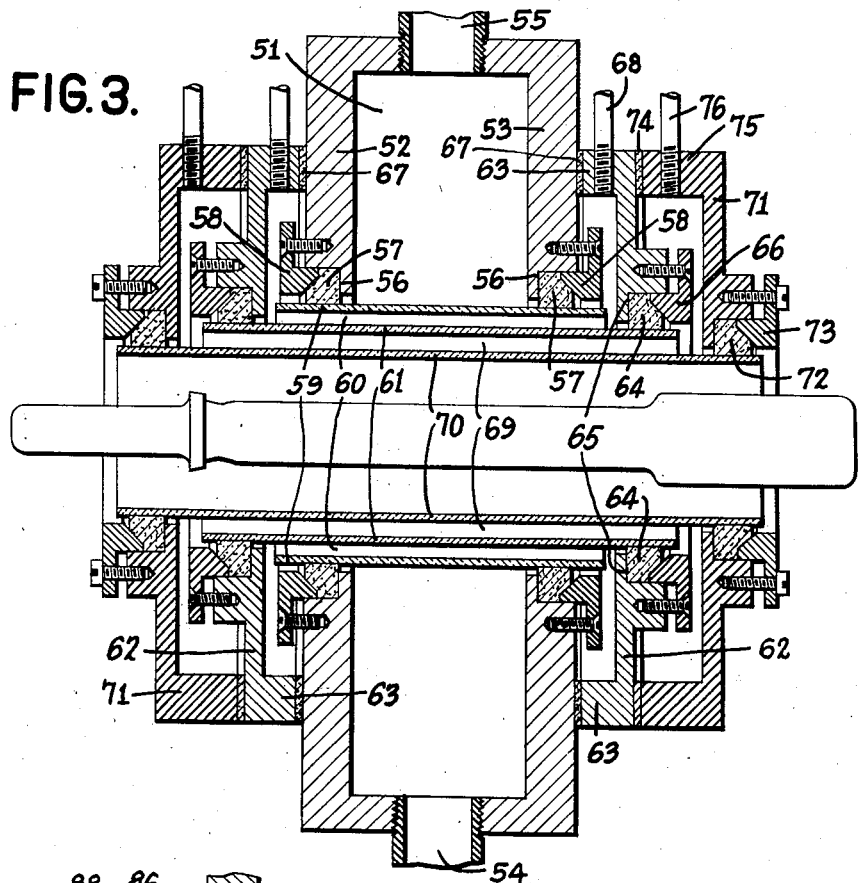
Figure 3 is an enlarged view in section, taken through a modified form of treating device, such device being constructed in such manner that a plurality of successive chambers are provided between the source of active rays and the substance treated, thus affording a means for selecting the character of radiation from the source of rays more effectively.

In Figure 3 there is shown a modified construction in which a chamber 51 is formed with side walls 52 and 53. Supply and exhaust pipes 55 and 54 respectively afford means for supplying a substance to the chamber 51 continuously. Annular recesses 56 are formed in the walls 52 and 53, in the outer sides thereof and receive packing 57 which is secured in position by means of glands 58. This packing engages a tube 59 of quartz or other suitable substance, a chamber 60 thus being formed within the tube 59 and between the inner surface thereof and a second concentric tube 61.

Supporting plates 62, formed with cylindrical flanges 63, are mounted upon opposite ends of the tube 61 through packing 64. This packing is received within recesses 65, formed in the outer portions of the supporting members 62 and secured in position by means of glands 66. The packing thus securely engages the ends of tube 61 and supports the members 62 thereon. Suitable packing 67 affords a tight connection between the flanges 63 and the respective walls 52 and 53 and thus affords a fluid tight chamber including the chamber 60. Supply and exhaust pipes 68 are provided for introducing a suitable medium into the chamber 60, and carrying the same away therefrom after having served its purpose.

A third concentric tube 70 is mounted within the tube 61 to afford a third chamber 69. This tube is mounted in supporting members 71 which carry packing 72 secured to the ends of the tube by means of glands 73. The manner of securing these elements is generally similar to that described in connection with the corresponding elements for mounting tubes 59 and 61 and further description thereof is believed unnecessary. Packing 74 affords a tight connection between the cylindrical flange 75 of the supporting member 71 and the adjacent surface of the supporting member 62. Supply and exhaust pipes 76 afford a means for introducing a desired medium into the chamber 69 and effecting the withdrawal thereof. It will be seen, from the above description, that substances of any desired character may be introduced in the respective chambers. For example, a substance to be treated by a desired type of active ray may be introduced and withdrawn from the chamber 51 continuously through the inlet 55 and outlet 54. In order to select the type of ray with which such substance is treated, a suitable medium may be introduced within chamber 60 to obstruct certain undesirable rays. Additionally, a medium may be introduced into the chamber 69 to obstruct other undesirable rays or effect the cooling of the entire mechanism. While the foregoing description is directed to one particular use of the apparatus described it will be readily apparent that the successive chambers may be used in any desired fashion, depending upon the circumstances surrounding the individual cases.

Figure 4:
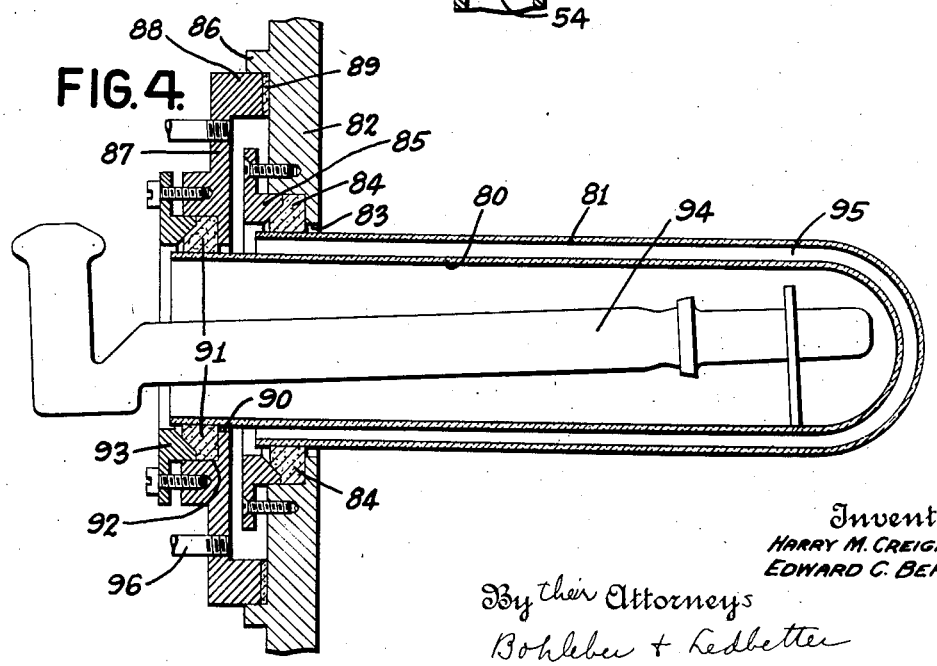
Figure 4 is a view in section, taken through the axis of a further modified form of the invention, the source of rays being enclosed in tubes which are mounted at one end only.

Figure 4 shows a modified construction in which concentric tubes 80 and 81 are mounted in one wall only of a chamber, this wall being indicated at 82. The ends of the tubes are closed and tube 81 is mounted within a cylindrical bore 83 and supported by packing 84 which is secured in position by a gland 85. A cylindrical shoulder 86 receives a cylindrical flange 88 of a supporting member 87, suitable packing 89 being provided to afford the desired fluid tight connection between the supporting wall 82 and supporting member 87. The tube 80 is carried by the supporting member 87 within a bore 90 thereof, packing 91 being mounted within a cylindrical recess 92 in the supporting member 87 and secured in position by gland 93 to mount the tube 80 positively within tube 81. A mercury vapor lamp 94 is provided within tube 80 to afford a source of active rays and the chamber 95, between the tubes 80 and 81, has a suitable substance applied thereto and withdrawn therefrom by means of pipes 96. It will be seen that this construction is particularly adaptable to chambers in large containers or to open flumes where only one wall is available for installing the treating mechanism.

It will be observed, in connection with the devices described herein, that the source of active rays, in each case a mercury vapor lamp, has been disposed coaxial with respect to the enclosures and treating chambers. This results in the maximum selective radiation of the source into the chambers and is preferable in commercial structures. It will be understood, of course, that other dispositions of the source may be made to good purpose and the source of light, itself, may be that which is suitable to the purposes desired to be accomplished. The disposition of the elements is only relative, it being obvious that the parts may be oriented in any desired manner to effect the purposes described.

With reference to Figure 5, a modified device is shown in which a housing 100 is formed with end walls 101. These end walls are formed with annular recesses 102 within which packing 103 is received. Packing glands 104 secure the packing in position and force it outwardly against reentrant cylindrical extensions 105 of a tube 106. The reentrant portions 105 form chambers between the packing and the source of active rays to prevent the rays from having a deleterious effect upon the packing and thus preserve the life of the latter. Connections 107 and 107A afford means respectively for introducing and withdrawing a suitable substance from the chamber 108 within the housing, and a mercury vapor lamp is indicated at 109.

The reversely extending cylindrical portions 105 are formed in such manner that they do not extend into the chamber 108 beyond the side walls 101 thereof. In this manner, they do not cut off any more useful radiations than the walls 101 themselves and the depth of the recesses formed between the reentrant portions 105 and the tube 106 is sufficient to extend beyond the outer edges of the packing 103. The liquid to be treated fills the chamber 108 and the recesses above mentioned and thereby absorbs the direct heat radiations from the lamp which pass through the tube 106. Additionally, the heat from this lamp is conducted away from the packing and thus is prevented from affecting the same deleteriously. When fluids quite transparent to ultra-violet rays are to be treated, suitable metallic or other bands 110 may be inserted in the recesses between the reentrant portions 105 and the tube 106, these bands being conveniently supported to cut off ultra-violet radiation which may penetrate the liquid in such recesses and deteriorate the packing 103.

Figure 6 illustrates a modified construction similar to Figure 5 but in which the tube 111 is closed at one end and supported in a wall 112. This wall may be formed with a recess 113 and a cylindrical bore 114, packing 115 being secured in position by means of a gland 116. The tube is formed with a reentrant portion 117, thus providing a recess 118 between the reentrant portion and the tube 111. A metallic band 119 may be inserted in the recess 118 to protect the packing 115 when a fluid highly transparent to ultraviolet rays is treated. The foregoing construction is adaptable for use in instances similar to those in which the device shown in Figure 4 is used and further description is believed unnecessary.

In the construction shown in Figure 7, a supporting wall 120 carries a gland 121 between which and the supporting wall 120, packing 122 is secured. Concentric tubes 123 abut against the packing and are secured in position by means of the pressure exerted upon the packing by the gland 121. In this manner, the chamber 124, between the tubes 123, is rendered fluid tight and a suitable substance may be introduced therein in a manner similar to that described in connection with the construction shown in Figure 3.

In Figure 8, the supporting wall 120 and gland 121 mount a packing 125 which is formed with concentric annular recesses 126. The ends of tubes 123 are received within the recess 126 and thus form a fluid tight chamber 124 therebetween.

Figure 9 is descriptive of a further modification in which the supporting wall 120 mounts a packing 127 between a flange 128 in the wall and a packing gland 129. An annular recess 130 is formed in the packing 127 and receives the end of a tube 131. A supporting member 132 is formed with a cylindrical flange 133 which overlies a correspondingly formed flange 134 on the mounting wall 120 and affords a desired connection between the supporting wall and the member 132. Concentric flange 135 carries packing 136 which receives the end of a tube 137 and a bolt 138 secures the elements in assembled position. In this manner, the desired chamber 124 is provided between the tubes 131 and 137.

With reference to Figure 10, a modified device is shown for treating a substance in a comparatively thin film with the desired active rays. Where the substance is opaque or partially opaque, it is necessary, as described hereinbefore, to treat all portions thereof uniformly. It is contemplated to effect the successive treating of portions of substances of this character, such treated portions being mixed with untreated portions between the successive treating steps in order that the resulting process provides a substance which is relatively uniformly treated. Thus, in Figure 10, a container 150, shown as cylindrical, is provided with baffles 151, disposed radially within the container and extending inwardly from the outer wall thereof. A series of radial baffles 152 is mounted within the container, these baffles lying between the respective baffles 151 and being spaced from the outer wall 150 as at 153. The foregoing baffles are alternately spaced within the container to direct the flow of the substance to be treated in a circuitous path, repeatedly directing such substance to that portion of the container which is provided with the active rays. This device is provided with an inlet 107a for the substance to be treated and an outlet 107 for the substance after treatment.

A tube 154, of quartz or other suitable material, is disposed axially of the housing in contact with the inner ends of baffles 152. Within this tube a source of ultra-violet rays, 155 is mounted so that rays therefrom are directed through the tube 154 to treat the substance flowing between the baffles. There does not result from the above treatment any over treatment of the surface of the substance in order to provide proper treatment of the entire substance.

With reference to Figure 11, there is shown a construction in which a fewer number of baffles is used. These baffles are shown at 156 and are directed inwardly in a radial manner. Diametrically opposed outwardly projecting baffles 157 are mounted within the casing and spaced from the exterior of the housing 150 as at 158. The quartz enclosure 154 is similar to that shown in Figure 10 and the source of active rays is again indicated at 155. The inner ends of baffles 156 are flared outwardly as indicated at 159, a spacing 160 being provided between the cylindrical surfaces of the flared portions 159 and the enclosure 154. The foregoing structure causes portions of the substance treated to be exposed to the influence of the active rays over a relatively extended portion of the enclosure 154, such flow of the substance being desirable under certain conditions. This construction is equipped with an inlet 107a and an outlet 107.

It will be apparent, however, that the result attained by the foregoing constructions may be attained by providing a chamber in which a source of active rays is disposed, the substance to be treated being passed through such chamber one or more times until the desired treatment has been effected. For example, Figure 12 illustrates a chamber 160 within which a source of active rays 161 is mounted. A suitable enclosure 162 is mounted within the chamber 160 in a manner described hereinbefore and conduit 163 conducts the substance away from the chamber and carries it to a collecting tank 164. Pipe 165 introduces a substance into the chamber again, pump 166 providing a continuous flow. It will be readily apparent that the substance may be forced through the system one or more times until all portions thereof have been adequately treated by the active rays, the portions treated at each successive stage being mixed with portions not treated and the entire body of the substance thereby uniformly activated.

In irradiating with apparatus such as shown in Figs. 1, 2 and 10, for example, it is evident that uniformity of the treatment of the surface of the layer is not always easy to accomplish. We have, therefore, provided in the device shown in Fig. 11 means, such as baffle mechanism, which not only enables the milk to be exposed to ultra violet rays free from substantial mixing, but enables each exposure to be more uniformly effected over the surface of the layer being exposed. Such mechanism enables the time of exposure of all portions of the surface of any particular layer of substance to be accurately controlled and thus effect the control and consequently the result of the irradiation of the substance being treated.

It will be seen from the foregoing that the construction shown in Fig. 11 is of substantial importance generally in the irradiation of substances which are opaque or substantially opaque to ultra violet rays and capable of being spoiled or detrimentally affected by irradiation. For example this construction enables us to obtain a much higher degree of beneficial effect before injuring or spoiling the substance.

Figure 13 shows a system similar to that shown in Figure 12, a succession of chambers 167 being provided, connected in tandem by pipes 168. The substance may be introduced into the chambers and carried away therefrom by means of pipes 169, the pump being used to circulate the substance as in Figure 12.

Figure 14 illustrates a system in which the substance to be treated is fed to the chambers 170 by means of a gravity feed system. Reservoirs 171, disposed at a suitable elevation, are connected with the chambers by means of pipes 172. Collecting tanks 173 are disposed at a suitable elevation below the chambers and the substance is carried from the chambers to such tanks by means of pipes 174.

From the drawings taken in connection with the foregoing description it will be seen that provisions are made such that the substance to be treated is exposed to ultra violet rays in the form of layers so thick that at no time is the substance transparent to such rays because the "films" or layers in which the substance is presented are too thick for the rays to pass through them, with a result that in the normal operation of the device only the portion of the substance proximate the light source is treated and that there is never any necessity to over-treat said proximate portion in an effort to properly treat the remote portion.

It will be apparent from the foregoing, that the depth of the material under the baffle may be varied in accordance with the characteristics of such material, the desired treatment thus being determined by the particular substance treated. A wide variety of substances may be treated by means of the apparatus described hereinbefore either gases, fluids, or solids, as well as fluids with solids in suspension. For example, powdered substances may be blown through the chambers to effect the desired treatment thereof. In the marketing of orange juice, it is desirable to preserve some of the pulp in the juice since it contains valuable food value and has a great deal to do with the appearance of the products. The organisms attached to this pulp may be effectively sterilized by means of the apparatus described herein, since such particles of pulp repeatedly come under the influence of the active rays to effect the treatment thereof upon all sides.

It will be apparent from the foregoing description that an apparatus has been provided for effectively treating substances with active rays. Not only is the apparatus of such character that all portions of the substance are uniformly treated, but the substance may be treated by selective radiation, such radiation being effected by selecting suitable filtering media for the intermediate chambers between the source of active rays and the substance treated. While the invention has been described with specific reference to the structure including the several modifications shown in the accompanying drawings, it is not to be limited, save as defined in the appended claims.

We claim as our invention:

1. A device for treating substances with active rays comprising a chamber adapted to contain a substance to be treated, packing carried by a wall of the chamber, an enclosure for a source of active rays, a spaced reentrant portion formed on an end of the enclosure, and means to mount the reentrant portion in the packing outside the inner surface of the wall.

2. A device for treating substances with active rays comprising a chamber adapted to contain a substance to be treated, packing carried by a wall of the chamber, an enclosure for a source of active rays, a reentrant portion formed on an end of the enclosure and spaced from the outside surface thereof, and means to mount the reentrant portion in the packing with the inner end of the reentrant portion lying substantially in the plane of the inner side of the wall of the chamber.

3. A device for treating substances with active rays comprising a chamber adapted to contain a substance to be treated, packing carried in spaced walls of the chamber, an enclosure for a source of active rays, said enclosure being formed with reentrant cylindrical ends outside the enclosure and communicating with the chamber, and means to mount the reentrant ends in the packing.

4. A device for treating substances with active rays comprising a chamber adapted to contain a substance to be treated, an enclosure for a source of active rays, packing carried by the chamber, means to mount the enclosure in the packing, a recess formed in the enclosure between the packing and the source, and a metallic shield in the recess.

5. A device for treating substances with active rays comprising a chamber adapted to contain a substance to be treated, an enclosure for a source of active rays, packing carried by the chamber, means to mount the enclosure in the packing, a recess formed in the enclosure between the packing and the source, and a protecting means in the recess.

6. A device for treating substances with active rays comprising a chamber adapted to contain a substance to be treated, an enclosure for a source of active rays, packing carried by the chamber, a reentrant cylindrical portion on the enclosure spaced therefrom and communicating with the chamber, and means to mount the reentrant portion in the packing.

7. A device for treating substances with active rays comprising a chamber adapted to contain a substance to be treated, an enclosure for a source of active rays, packing carried by the chamber, means to mount the enclosure in the packing, and a recess formed in the enclosure between the packing and the source and communicating with the chamber.

8. A device for treating substances with active rays comprising a chamber adapted to contain a substance to be treated, an enclosure for a source of active rays, packing carried by the chamber, means to mount the enclosure in the packing, and a recess formed in the enclosure between the packing and the source.

9. A device for treating substances with active rays comprising a chamber adapted to contain a substance to be treated, an enclosure for a source of active rays, packing carried by the chamber, means to mount the enclosure in the packing, and means carried by the enclosure to protect the packing from the source.

10. A device for treating substances with active rays comprising a housing adapted to contain a substance to be treated, a tubular enclosure mounted in a wall of the housing, a supporting means carried by the wall, and a second enclosure carried by a supplemental wall mounted upon said housing and within the first enclosure, each of said enclosures having a closed end, said enclosures and walls forming a chamber isolated from said housing.

11. A device for treating substances with active rays comprising a housing adapted to contain a substance to be treated, a tubular enclosure mounted in a wall of the housing, a supporting plate carried by the wall and spaced therefrom, a flange on the plate engaging the wall to form a chamber between the wall and plate, a second enclosure carried by the plate and extending within the first enclosure to form a chamber communicating with the first chamber, and means to direct a flow of a medium through the chambers.

12. A device for treating substances with active rays comprising a housing adapted to contain a substance to be treated, a tubular enclosure mounted in a wall of the housing, a supporting plate carried by the wall and spaced therefrom, a flange on the plate engaging the wall to form a chamber between the wall and plate, and a second enclosure carried by the plate and extending within the first enclosure.

13. A device for treating substances with active rays comprising a chamber adapted to contain a substance to be treated, packing carried by a wall of the chamber, an enclosure for a source of active rays having a closed end, a spaced reentrant portion formed on the open end of the enclosure, and means to mount the reentrant portion in the packing outside the inner surface of the wall.

14. A device for treating substances with active rays comprising a housing adapted to contain a substance to be treated, a tubular enclosure mounted in a wall of the housing and having a closed end, a supporting plate carried by the wall and spaced therefrom, a flange on the plate engaging the wall to form a chamber between the wall and plate, a second enclosure carried by the plate and extending within the first enclosure, the end so extending being closed whereby a closed chamber is formed communicating with the first chamber, and means to direct a flow of a medium through the chambers.

15. A device for treating substances with active rays comprising a housing adapted to contain a substance to be treated, a tubular enclosure carried by the housing, supporting plates having cylindrical flanges engaging opposite sides of the housing, a tubular enclosure carried by the supporting plates and within the first enclosure, means located at one side of both enclosures and carried by one of the plates for introducing a medium within a chamber formed between the enclosures and between the housing and plates, and means carried by both plates for conducting the medium away from the chamber, said last mentioned means being connected to said chamber at points diametrically opposite said first mentioned means on the other side of said enclosures.

16. A device for treating substances with active rays comprising a housing adapted to contain a substance to be treated, a source of active rays therein, a chamber between the source and substance to be treated having an enlarged annular antechamber at each end thereof, means to introduce a medium into the chamber through an antechamber, and a plurality of spaced means located at the opposite side of said antechambers to carry the medium away from said chamber and at the same time facilitate the circulation of said medium in passing through the chamber.

17. A device for treating substances with active rays comprising a housing adapted to contain a substance to be treated, a source of active rays therein, a chamber between the source and substance having an enlarged annular antechamber at each end thereof, means to introduce a medium into the chamber through an antechamber, and a plurality of means located at the opposite side of said antechambers to carry the medium away from said chamber and at the same time facilitate the circulation of said medium in passing through the chamber.

18. A device for treating substances with active rays comprising a housing adapted to contain a substance to be treated, a source of active rays in said housing, an annular chamber open at each end and disposed between said source and substance, said chamber being formed by a pair of concentric tubes transparent to active rays and disposed around said source and forming annular openings at the ends thereof, chambers at each end of the annular chamber adapted to communicate respectively therewith through said annular openings, means for supporting each tube on the outside surface thereof without obstructing communication between the first mentioned chamber and said end chambers, and means for maintaining a filtering medium in said chamber.

19. A device for treating substances with active rays comprising a housing adapted to contain a substance to be treated, a source of active rays in said housing, an annular chamber open at each end and disposed between said source and substance, said chamber being formed by a pair of concentric tubes transparent to active rays and disposed around said source and forming annular openings at the ends thereof, chambers at each end of the annular chamber adapted to communicate respectively therewith through said annular openings, means for supporting each tube on the outside surface thereof without obstructing communication between the first mentioned chamber and the end chambers, and means for circulating a fluid filtering medium in said chamber.

20. A device for treating substances with active rays comprising a chamber adapted to contain a substance to be treated, an enclosure for a source of active rays, a baffle extending from said enclosure toward the wall of said chamber, baffle means extending from the wall of said chamber toward said enclosure, and enlarged extremities on the baffle means, said extremities having an extended surface adjacent the enclosure and parallel to the surface thereof, and said baffle and baffle means forming a mixing chamber for said substance substantially removed from the influence of rays emanating from said source.

21. A device for treating substances with active rays comprising a housing adapted to contain substances to be treated, a source of active rays in said housing, a plurality of concentric tubes transparent to said active rays and disposed around said source and forming an annular chamber having annular openings at the ends thereof, means communicating with said annular openings for circulating a fluid through said annular chamber, an independently removable means for supporting each tube through contact with only the outside surface thereof such that said tubes are adapted to be removed from said chamber one at a time without disturbing a remaining tube or tubes.

22. A device for treating substances with active rays comprising a housing adapted to contain a substance to be treated, a tubular enclosure mounted in the opposite walls of the housing, and a second enclosure located within the first enclosure and carried by supplemental walls mounted upon said housing whereby said second enclosure is adapted to be removed independently of said first enclosure, each of said enclosures having open ends, said enclosures, walls, and supplemental walls, forming a chamber isolated from said housing, and adapted to contain a filtering medium.

23. A device for treating substances with active rays comprising a housing adapted to contain substances to be treated, a source of active rays in said housing, a plurality of concentric tubes transparent to said active rays and disposed around said source and forming an annular chamber having annular openings at the ends thereof, means communicating with said annular openings for circulating a fluid through said annular chamber, and wholly independently removable means for supporting each tube.

24. In a device for irradiating by means of ultra violet rays of a partially opaque substance capable of having beneficial and detrimental effects imparted thereto, an enclosure permeable to ultra violet rays, a source of ultra violet rays within said enclosure, and an outer wall surrounding said enclosure and forming with the latter a chamber through which the substance to be irradiated is adapted to be passed, in combination with mechanism within said chamber for successively exposing portions of said substance to said source of rays and mixing between exposures said treated portions of said substance with untreated portions thereof, said mechanism comprising means cooperating with said enclosure for defining a plurality of separate restricted elongated paths through which the substance is adapted to flow past and be exposed to said source of rays free from substantial mixing, and a plurality of separate mixing compartments substantially isolated by said means from the influence of said rays and alternating with said elongated paths.

25. In a device for irradiating by means of ultra violet rays of a partially opaque substance capable of having beneficial and detrimental effects imparted thereto, an enclosure permeable to ultra violet rays, a source of ultra violet rays within said enclosure, and an outer wall surrounding said enclosure and forming with the latter a chamber through which the substance to be irradiated is adapted to be passed, in combination with mechanism for exposing portions of said substance to said rays and mixing said exposed portions with unexposed portions thereof, said mechanism comprising means substantially parallel to and cooperating with the outer surface of said enclosure for defining a plurality of separate restricted elongated paths through which the substance is adapted to flow past and be exposed to said source of rays free from substantial mixing, means cooperating with the aforesaid means and with said wall for defining a plurality of separate mixing compartments alternating with said elongated paths, said compartments being substantially isolated by the first mentioned means from the influence of said rays, and means for forcing said substance through said chamber.

HARRY M. CREIGHTON.
EDWARD C. BERNDT.